Patented Sept. 12, 1944

2,358,290

UNITED STATES PATENT OFFICE 2,358,290

PACKING MATERIAL

Herman T. Kraft, Akron, Ohio, assignor to The General Tire & Rubber Company, Akron, Ohio, a corporation of Ohio No Drawing. Application March 12, 1941, Serial No. 382,941

9 Claims. (Cl. 260—36)

This invention relates to low friction rubber compositions and to a method of preparing the same. It particularly relates to self-lubricating gasket materials suitable for preparing gaskets for pneumatic hoists and the like.

Numerous graphite-rubber compositions and graphite-rubber packings, etc., have heretofore been prepared by mixing the so-called amorphous graphite into either solid rubber or rubber cement. When, however, an attempt is made to prepare flaked graphite-rubber mixes by simply masticating flaked graphite into a solid rubber compound, it is found that a uniform dispersion of graphite in the rubber is not obtained, especially when the quantity of the graphite exceeds about 50% of the rubber mix. When the quantity of graphite added to the rubber becomes too great, disintegration of the rubber compound occurs.

It has now been found that flaked graphite, when properly incorporated into a relatively highly reinforced rubber, imparts superior lubricating qualities and superior oil-resistance to the rubber compound. It has also now been found that when the graphite flakes are previously mixed with an oily liquid, which is a plasticizer or compatible with the particular rubber, before it is milled into the solid, compounded, vulcanizable rubberlike material, that a good dispersion of the graphite in the rubber compound is obtained. This is especially true with flaked graphite, but a superior dispersion and a mix of somewhat superior properties are also obtained in the same manner with the amorphous type graphite used heretofore.

For the preparation of gasket material according to the present invention, a suitable quantity of flaked graphite is mixed with a suitable amount, such as 1% to 10% and preferably about 2% to 4% or so, of a plasticizing and lubricating liquid. The mixture thus prepared is incorporated by mastication into a solid, curable, natural or synthetic rubber compound, which has been compounded to resist abrasion.

The flaked graphite-mineral oil mixture should always exceed 50% of the rubber and it should preferably be about 100% to 125%, or even 150%, of the weight of the abrasion-resistant rubberlike compound. When the percentage of graphite is decreased below about 75% of the remainder of the rubberlike compound, the lubricating characteristics are decreased to an undesirable extent; when the quantity of graphite is more than about 175% or 200% of the abrasion-resistant rubberlike compound, the strength of the composition is usually unduly impaired.

The abrasion-resistant rubber compound should be of a curable or vulcanizable type and should contain at least 20 or 30, and preferably 40 to 70 or 80 parts by weight of carbon black, gas black, or other reinforcing type of finely divided carbon, based on the rubber in the compound. The carbon black strengthens most rubbers and also stiffens the material and greatly increases its wear-resistance.

The rubber may be any one of the synthetic rubbers now available, or it may be Hevea rubber. Hevea rubber is usually preferred in most instances, but when the gasket is to be used directly and continuously in contact with the more volatile types of petroleum liquids, a synthetic rubber, which is more oil-resistant to these materials than Hevea rubber, is usually preferred. The rubber is preferably compounded with vulcanizing agents, a suitable plasticizer or softener, a vulcanization accelerator, an activator, and an antioxidant, as is well-known in the art, to produce a compound of a type suitable for tire treads and the like.

The type of lubricating or oily liquid that is mixed with the graphite depends upon the characteristics of the rubber, and it should be selected so that it is completely compatible therewith or miscible therein. When a natural rubber, such as Hevea rubber, forms the principal basis of the abrasion-resistant compound, the graphite is preferably mixed with a mineral oil, which is most desirable in that it also serves to greatly increase the self-lubricating properties of the gasket material. Other oils, such as vegetable or animal oils, etc., which are compatible with the rubber may, however, be used, although the lubricating properties of the material are generally inferior. When the base of the abrasion-resistant rubber compound is a synthetic rubber which is oil-resistant and incompatible, the graphite should be mixed with a plasticizing liquid of a type that is compatible with the particular synthetic rubber. Thus, if the co-polymer of acrylic nitrile and butadiene, available under the trade name "Perbunan," or if "neoprene" (polychloroprene) is used, the plasticizing liquid lubricant with which the flaked graphite is mixed is preferably a high boiling ester, such as a phthalic acid ester, for example dibutyl-phthalate, methyl ricinoleate, dibutyl-sebacate, a high boiling ether, such as dibenzyl ether, or other high boiling compatible liquids.

If instead of mixing the graphite with a compatible liquid lubricant it is mixed with an incompatible liquid lubricant, the rubber compound tends to completely disintegrate when much more than 50% of the graphite mix is incorporated therein. Thus "neoprene" (polychloroprene) which is considered incompatible and unswelled by mineral oil becomes simply disintegrated when one attempts to mill desirable amounts of a mixture of oil and flaked graphite therein; whereas, when the graphite is mixed with an oily liquid compatible with a "neoprene" compound, a mix of very desirable properties is obtained.

The following examples, in which the parts are by weight, illustrate a compound suitable for the preparation of gaskets for hydraulic or pneumatic lifts and the like.

Example I

| | Parts |
|---|---|
| Flaked graphite (mixed with 2% mineral oil) | 185 |
| Hevea rubber (smoked sheet) | 100 |
| Carbon black | 50 |
| Stearic acid | 2 |
| Zinc oxide | 5 |
| Sulfur | 3 |
| Accelerator | 1½ |
| Antioxidant | 1 |
| Pine tar | 2 |

The rubber was first masticated with the carbon black, the curing agent, the accelerator and the zinc oxide so as to form a curable compound similar to rubber tread stock, and the graphite-rubber mix was slowly mixed therein on a warm rubber mill. The graphite-rubber composition may be molded and cured in suitable shape for gaskets or rolled out into sheets about one-half inch thick, which may be cured either in open steam or between platens.

Example II

An equal quantity of "neoprene" or "Perbunan" was substituted for the rubber in Example I and dibutyl phthalate, diphenyl ether, or other compatible oil liquid was substituted for the mineral oil. Otherwise the ingredients were substantially in the same proportion and the mixing was carried out on a rubber mill in the same manner. The product was similar to that of Example I, but it was more resistant to light aliphatic hydrocarbon liquids.

Although rubber itself is readily attacked by ordinary mineral lubricating oils, flaked graphite renders the composition so impermeable to mineral oil that no difficulty is experienced and no appreciable swelling takes place when the gasket of the composition of the above examples is used in the immediate vicinity of mineral lubricating oils. The gasket material is very impervious to liquids and although it is soft and flexible it is substantially incompressible. The rubber being previously undissolved has superior properties to rubber which has been previously dissolved.

It is to be understood that the particular form of product shown and described and the particular procedure set forth are presented for purposes of explanation and illustration, and that various modifications of said product and procedure can be made without departing from my invention as defined in the appended claims.

What I claim is:

1. A solid, homogeneous gasket material comprising about 100 parts of previously undissolved polychloroprene, at least 30 parts of carbon black, at least 100 parts of graphite flakes, said graphite flakes being premixed with an oily plasticizer for the polychloroprene.

2. In a method of making a gasket containing graphite flakes and a soft vulcanizable rubber compound containing natural rubber and about 20 to 80 parts of carbon black for each 100 parts of rubber, the steps which comprise forming an intimate mixture of flaked graphite and mineral oil, the amount of mineral oil being about 1 part to about 10 parts by weight of said graphite, and masticating the oily mixture thus formed into said rubber to cause dispersion of the graphite throughout said rubber compound, the amount of said graphite being at least equal to the rubber of said compound.

3. A material for forming abrasion and oil-resistant gaskets and the like, comprising a soft vulcanizable mix containing a solid vulcanizable rubberlike material selected from the group consisting of natural rubber, polychloroprene, and a copolymer of butadiene and acrylonitrile, carbon black and graphite flakes premixed with an oily plasticizer, said carbon black being present in an amount between 20 and 80 parts per each 100 parts of said rubberlike material, said graphite flakes being present in an amount at least equal to the amount of said rubberlike material in said compound, said mix being characterized by having said graphite flakes substantially uniformly dispersed throughout.

4. The gasket-forming material of claim 3 in which the oily plasticizer is mineral oil.

5. An oil-resistant and abrasion-resistant gasket comprising a soft, vulcanized carbon black reinforced mix containing previously undissolved rubberlike material selected from the group consisting of natural rubber, polychloroprene, and a copolymer of butadiene and acrylonitrile, and having dispersed therein flaked graphite, said graphite being present in an amount of about 100% to about 175% by weight of said rubberlike material of said compound, said carbon black being present in an amount between 20 and 80 parts per each 100 parts of said rubberlike material, said mix being one prepared by mixing said graphite flakes first with an oily plasticizer for said rubberlike material and then incorporating the mixture thus obtained with the solid vulcanizable material, said mix being characterized by having the graphite flakes more uniformly dispersed therethrough than when the flakes are masticated into the rubberlike material without first beng mixed with said plasticizer.

6. An oil-resistant and abrasion-resistant gasket comprising a soft, vulcanized, carbon black reinforced mix containing previously undissolved natural rubber having dispersed therein flaked graphite, said graphite being present in an amount of about 100% to about 175% by weight of said natural rubber of said compound, said carbon black being present in an amount between 20 and 80 parts per each 100 parts of said natural rubber, said mix being one prepared by mixing said graphite flakes first with an oily plasticizer for said natural rubber and then incorporating the mixture thus obtained with the rubber, said mix being characterized by having the graphite flakes more uniformly dispersed therethrough than when the flakes are masticated into the natural rubber without first being mixed with said plasticizer.

7. An oil-resistant and abrasion-resistant, plastic, vulcanizable material comprising a solid, soft vulcanizable, carbon black reinforced mix of a previously undissolved rubberlike material selected from the group consisting of natural rubber, polychloroprene, and a copolymer of butadiene and acrylonitrile, and having dispersed therein flaked graphite, said graphite being present in an amount of about 100% to about 175% by weight of said rubberlike material of said mix, said carbon black being present in an amount between 20 and 80 parts per each 100 parts of said rubberlike material, said mix being one prepared by mixing said graphite flakes first with an oily plasticizer for said rubberlike material and then incorporating the mixture thus obtained with the solid vulcanizable material, said mix being characterized by having the graphite flakes more uniformly dispersed therethrough than when the flakes are masticated into the rubberlike material without first being mixed with said plasticizer.

8. In a method of making a gasket-forming material having graphite bonded together with a vulcanizable compound containing a rubberlike material selected from the group consisting of natural rubber, a copolymer of butadiene and acrylonitrile, and polychloroprene, and about 20 to 80 parts of carbon black for each 100 parts of the rubberlike material and having graphite present in an amount at least equal to the amount of rubberlike material of said compound, the steps which comprise compounding the solid vulcanizable rubberlike material to produce a solid soft vulcanizable compound, mixing graphite flakes with about 1% to about 10% of an oily plasticizer for the rubberlike material of said compound, and masticating the oily graphite mixture thus formed into said solid compound whereby the graphite is dispersed throughout said compound.

9. In a method of making a gasket-forming material having graphite bonded together with a compound containing a rubberlike material selected from the group consisting of natural rubber, polychloroprene, and a copolymer of butadiene and acrylonitrile, and 20 to 70 parts of carbon black for each 100 parts of said rubberlike material and having graphite present in an amount at least equal to an amount of rubberlike material of said compound, the steps which comprise compounding the solid rubberlike material to a solid compound vulcanizable to a soft rubber, mixing graphite flakes with about 2% to about 4% of an oily plasticizer for the rubber in said compound, masticating the oily flaky mixture thus formed into said compound, shaping the mixture thus prepared in desired form, and curing the rubberlike material of said compound to a soft vulcanizable state.

HERMAN T. KRAFT.